United States Patent
Aujollet et al.

(10) Patent No.: US 6,665,366 B2
(45) Date of Patent: Dec. 16, 2003

(54) MONOBLOC FUEL ELEMENT AND BOILING WATER AND FAST SPECTRUM NUCLEAR REACTOR USING SUCH ELEMENTS

(75) Inventors: Patrick Aujollet, Pertuis (FR); Jacques Porta, Rians (FR); Stéfano Baldi, Turin (IT)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/030,427

(22) PCT Filed: May 15, 2001

(86) PCT No.: PCT/FR01/01467
§ 371 (c)(1),
(2), (4) Date: Jan. 10, 2002

(87) PCT Pub. No.: WO01/88927
PCT Pub. Date: Nov. 22, 2001

(65) Prior Publication Data
US 2003/0103594 A1 Jun. 5, 2003

(30) Foreign Application Priority Data
May 16, 2000 (FR) .............................................. 00 06204

(51) Int. Cl.$^7$ ................................................. G21C 3/30
(52) U.S. Cl. ........................ 376/427; 376/432; 376/434; 376/903
(58) Field of Search ................................ 376/918, 434, 376/432, 427, 453, 903

(56) References Cited

U.S. PATENT DOCUMENTS

| | | | | |
|---|---|---|---|---|
| 3,291,696 A | * | 12/1966 | Sugimoto et al. | ........... 376/423 |
| 3,836,311 A | * | 9/1974 | Hackstein et al. | ........... 376/427 |
| 3,855,061 A | | 12/1974 | Triggiani et al. | |
| 3,891,502 A | * | 6/1975 | Hackstein et al. | ........... 376/427 |
| 3,923,596 A | * | 12/1975 | Leonard, Jr. | ................. 376/432 |
| 3,996,319 A | * | 12/1976 | Hackstein et al. | ........... 376/903 |
| 4,093,682 A | * | 6/1978 | Hrovat et al. | ................ 376/427 |
| 4,134,791 A | | 1/1979 | Delafosse | |
| 4,311,559 A | | 1/1982 | Knowles | |
| 4,348,355 A | * | 9/1982 | Nylund | ........................ 376/434 |
| 4,705,577 A | * | 11/1987 | Ondracek | ........................ 419/8 |
| 4,708,845 A | * | 11/1987 | Mildrum et al. | ............. 376/435 |
| 4,759,912 A | * | 7/1988 | Taleyarkhan | ................. 376/435 |
| 4,963,317 A | * | 10/1990 | Wiencek et al. | ............. 376/422 |
| 5,692,024 A | * | 11/1997 | McClelland et al. | ........ 376/245 |

FOREIGN PATENT DOCUMENTS

| | | | | |
|---|---|---|---|---|
| FR | 2 143 137 | | 2/1973 | |
| FR | 2 243 495 | | 4/1975 | |
| FR | 2 354 610 | | 1/1978 | |
| GB | 898 022 | | 6/1962 | |
| GB | 2 021 844 | | 12/1979 | |
| JP | 52053196 A | * | 4/1977 | ................. 376/327 |

* cited by examiner

Primary Examiner—Michael J. Carone
Assistant Examiner—David Matz
(74) Attorney, Agent, or Firm—Oblon, Spivak, McClelland, Maier & Neustadt, P.C.

(57) ABSTRACT

A single piece fuel element and fast spectrum boiling water reactor using such a single piece fuel element. The single piece fuel element is formed from coated fissile particles embedded in a matrix made from a material such as SiC that is inert to all fissile and fertile heavy nuclei and to the coolant fluid circulating in and around this element. Furthermore, the fuel element includes parallel plates delimiting spaces between them. A ratio between the thickness of the plates and the width of the spaces is set so that the fuel element can be put in fast spectrum or thermal spectrum at will. An application of the single piece fuel element to a fast spectrum boiling water nuclear reactor operating with natural circulation in which the above mentioned ratio is approximately equal to 1 enables a high consumption of plutonium.

13 Claims, 3 Drawing Sheets

MONOBLOC FUEL ELEMENT AND BOILING WATER AND FAST SPECTRUM NUCLEAR REACTOR USING SUCH ELEMENTS

TECHNICAL FIELD

The invention relates mainly to a single piece or solid fuel element designed for use in the core of a nuclear reactor in contact with any coolant fluid such as water or a gas, to define a fast or thermal spectrum simply by adapting its dimensions.

The invention also relates to a fast spectrum boiling water nuclear reactor using fuel elements of this type. In particular, this type of reactor may be used to consume plutonium produced in existing nuclear pressurized water reactors used for the generation of electricity.

STATE OF THE ART

Nuclear reactors designed for the production of electrical energy commonly use square or hexagonal nuclear fuel assemblies placed side by side to form the reactor core.

In this conventional layout, each assembly comprises a bundle of fuel rods supported on a frame. Each rod is composed of nuclear fuel pellets stacked on each other inside a long tube. In "UOX" type assemblies, nuclear fuel pellets are formed from uranium dioxide, comprising fertile uranium 238 atoms at fissile uranium 235 atoms. In "MOX" type assemblies, nuclear fuel pellets are formed from a mix of uranium dioxide and plutonium dioxide. They then comprise uranium 238 atoms, plutonium 238, 239, 241 and 242 atoms and a small proportion of uranium 235.

At the moment there are limitations in nuclear fuel assemblies of this type.

These problems include their complexity and cost, handling problems resulting from their deformation under irradiation and the need to provide expansion chambers for fission gases in the top and bottom parts of rods causing an increase in the height of the core and consequently the size and cost of the reactor.

In parallel to these conventional nuclear fuel assemblies, studies and experiments have been carried out on fuel elements formed from coated fissile particles agglomerated by a carbonaceous matrix. These fuel assemblies are intended essentially for use in high temperature nuclear reactors cooled by a cooling gas such as helium.

Coated fissile particles comprise a fissile nucleus with an approximately spherical shape, coated with several successive layers comprising particularly an internal porous layer capable of containing fission gases and supporting inflation of the nucleus, and a coat of silicon carbide SiC forming a leak tight barrier for fission products. These particles are said to be of the "TRISO" type. Their diameter can vary from a few hundred microns to a few millimeters, depending on the manufacturing process used.

At the moment, there are two types of fuel elements in which coated particles are agglomerated in a different form by a carbonaceous matrix.

In a first type of fuel element developed in the United States of America and in France, the coated particles are agglomerated in the form of cylindrical rods that are then inserted in vertical tubular ducts provided for this purpose in graphite blocks with a hexagonal cross-section forming the core of a high temperature gas cooled reactor. The cylindrical rods are obtained by agglomerating the coated particles and a matrix based on graphite powder.

In a second type of fuel element developed in Germany, the coated particles are agglomerated in the form of balls that are compacted in bulk with graphite balls of the same dimension, to form the core of a high temperature gas cooled reactor. The balls are obtained by agglomerating coated particles and a carbonaceous matrix to form the central part of the ball, and coating this central part with a peripheral layer without any coated particles.

These assemblies are used only for high temperature gas cooled reactors with a thermal neutron spectrum. With existing technology, it is impossible to use them in water reactors.

Experimentally, it has also been proposed that bundles of rods of conventional nuclear fuel assemblies should be replaced by a set of very thin plates (1 to 3 mm thick) placed parallel to each other inside the same assembly.

In general, the use of nuclear fuel assemblies incorporating a number of thin plates parallel to each other is limited to experimental reactors.

Conventional nuclear fuel assemblies with bundles of rods, usually of the "UOX" or "MOX" type, are used in pressurized water reactors operating in thermal spectrums used at the present time for generation of electricity.

Uranium 238 atoms contained in these assemblies are fertile in the epithermal range, in other words they capture neutrons to generate plutonium atoms, for which only the 239 and 241 isotopes are fissile in the thermal domain. The result is a large production of plutonium which represents a considerable energy potential and also a large source of radiotoxicity.

The need to control the nuclear material cycles makes it necessary to use plutonium produced in existing reactors as a fuel in reactors designed specially for this purpose. Thus, nuclear reactors are now being designed in order to use this plutonium as a fuel, in other words to produce electrical energy while consuming this plutonium to reduce the volume of waste originating from existing nuclear reactors.

However, most nuclear reactors being studied for this purpose at the moment use a moderator medium, in other words a neutron decelerator, to obtain a thermal or epithermal neutron spectrum. Furthermore, for reactor control reasons and particularly in order to improve the kinetic behaviour of the core, it appears that it would be necessary to use a variable proportion of uranium 238 with the plutonium. In a reactor operating in a thermal spectrum, this creates a source of plutonium nuclei that is contrary to the purpose of the exercise.

DESCRIPTION OF THE INVENTION

The main purpose of the invention is a new type of fuel element adapted to industrial implementation and without the disadvantages of conventional nuclear fuel assemblies with rod bundles.

Another purpose of the invention is a new design of fuel element that can be made to produce a spectrum of fast neutrons or a spectrum of thermal or epithermal neutrons at will, simply by changing its dimensions.

Another purpose of the invention is a fuel element with an innovative design that in particular makes it possible to use the plutonium produced by existing nuclear reactors as a fuel material, using a fast spectrum which is particularly conducive for consumption of plutonium.

According to the invention, these various results are obtained by means of a single piece fuel element for a nuclear reactor formed from coated fissile particles embedded in a matrix, characterised in that it comprises several parallel plates separated by spaces and connected to each other by junction parts, the said matrix being inert to the total number of heavy nuclei (fissile and fertile) and neutral to a coolant fluid circulating in the said spaces.

It would also be possible to put the fuel assembly in a metallic duct to protect it from the coolant fluid.

Due to its monolithic or single-piece nature, a fuel element formed in this way is inherently simpler than conventional assemblies used in existing nuclear reactors.

Furthermore, fission gases released under irradiation are retained in coated particles without it being necessary to provide expansion chambers comparable to the chambers currently used with rods containing nuclear fuel pellets. The total height of the core may be significantly less than the height used in a conventional reactor.

Furthermore, for a given coolant fluid, the ratio of the thickness of the plates and the width of spaces that separate them can be changed at will to give a fast spectrum or a thermal or epithermal spectrum.

According to the preferred embodiment of the invention, the fuel element has an approximately parallelepiped external shape.

In this embodiment, the plates are approximately plane.

Furthermore, the said plates are preferably approximately vertical and a control device can be inserted in at least one of the spaces separating them, to control or shutdown the reactor.

Furthermore, the parallel plates and the junction parts are advantageously perforated at predetermined levels to form windows through which the coolant fluid can pass, which increases the exchange surface area between the fuel element and the said fluid and homogenises the coolant fluid across the entire cross-section of the reactor core.

In one advantageous embodiment of the invention, the horizontal cross-section of the space in which a control device can be placed is in the shape of a cross and divides the fuel element into four sub-assemblies each comprising several plates connected to each other by some of the junction parts, other junction parts connecting the sub-assemblies together, at the periphery of the fuel element. A second control device independent of the first and also in the shape of a cross, may be placed between four adjacent fuel elements.

In another advantageous embodiment of the invention, a first space in which a first plate-shaped control device can be inserted is formed in a central part of the fuel element. A second series of spaces opening up into the periphery of the said element is then formed on at least one side of the central part, and a second rake-shaped control device can be placed in these spaces.

In general, the thickness of the plates and the width of the spaces are preferably uniform.

In the case described in which the coolant fluid is water, the ratio of the thickness of the plates and the width of the spaces is equal to 1, which will define a fast spectrum.

Preferably, coated particles comprise nuclei of fissile bodies chosen in the group including uranium and plutonium. A mix of particles based on plutonium and uranium respectively, and a choice of dimensions to enable operation in fast spectrum, are used to consume plutonium while assuring satisfactory control of the reactor.

The inert matrix is made from a material offering a low effective absorption cross-section with regard to neutrons and a high thermal conductivity.

Another purpose of the invention is a boiling water nuclear reactor comprising a core containing several fuel elements made as defined above, the ratio between the thickness of the plates and the width of spaces being a compromise between the constraints related to moderation of neutrons and extraction of thermal power. This ratio should be equal to approximately 1 to obtain a fast spectrum.

BRIEF DESCRIPTION OF THE DRAWINGS

We will now describe different embodiments of the invention as non-limitative examples with reference to the attached drawings in which.

DETAILED DESCRIPTION OF THE PREFERRED EMBODIMENTS OF THE INVENTION

Figure 1:
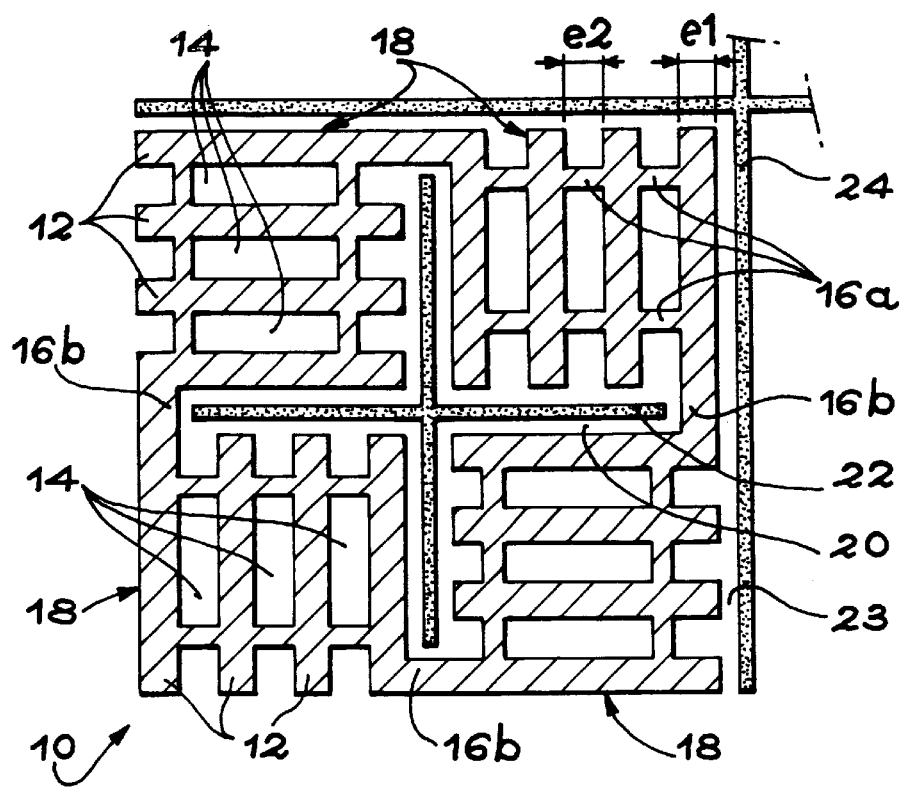
FIG. 1 is a top view that diagrammatically represents a fuel element according to a first embodiment of the invention.

In the various embodiments described, elements performing comparable functions are denoted using the same numeric references. FIG. 1 diagrammatically shows a top view of a fuel element 10 according to a first embodiment of the invention.

The fuel element 10 is in the form of a single part or a monolithic brick made in a single piece. In this embodiment, the external shape of the fuel element is approximately a parallelepiped. As an illustration of the invention, which is in no way restrictive, the fuel element may have a horizontal section in the form of a square with a side of approximately 30 cm and a height of less than 1 meter.

With this shape, it is possible to put identical fuel elements 10 adjacent to each other or on top of each other inside the nuclear reactor vessel, to form the core of this reactor. Thus, adjacent columns can be formed using a square grid, taking care to allow spaces between the fuel elements in adjacent columns. These spaces facilitate the circulation of a coolant fluid and also the installation of control devices if necessary, as will be described later.

Fuel elements in the same column can be held together by a framework that facilitates gripping by handling devices.

As an alternative, the fuel element 10 may have a different shape, such as a hexagonal-shaped cross-section in a horizontal plane.

According to a first aspect of the invention, the fuel element 10 comprises one or several groups of parallel plates 12 separated by spaces 14 and connected to each other by junction parts 16a and 16b. The plates 12 are plane and arranged approximately vertically, and thicknesses are uniform and identical in different plates. Similarly, the widths of spaces 14 separating adjacent plates 12 are uniform. In the embodiment illustrated, given as a non-limitative example in FIG. 1, the thickness of the plates 12 and the width of the spaces 14 are identical and approximately equal to 2 cm.

Figure 3:
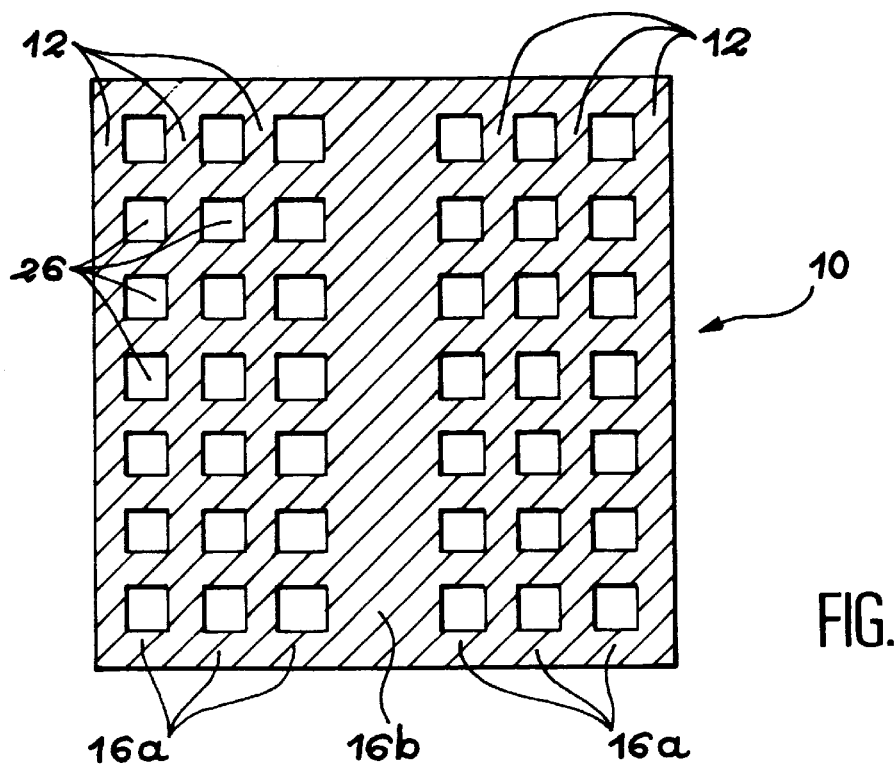
FIG. 3 is a side view of the fuel element shown in FIG. 2.

As shown in FIG. 3, the plates 12 and the junction parts 16a, 16b are perforated at determined levels to form windows 26 uniformly distributed over the full height of the fuel element.

This layout is a means of homogenising the coolant fluid in different fuel elements in order to limit instabilities in the power distribution related to the thermal part (low during normal operation) of the neutron flux. This is particularly useful when the fuel element is used in a boiling water nuclear reactor because the coolant fluid is then in the form of a two-phase mix. The windows 22 are then used to homogenise the steam void ratio of this mix over the entire cross-section of the reactor core.

The presence of the windows 26 also increases the exchange surface area between the fuel element 10 and the coolant fluid, and consequently the power density of the core while maintaining its neutron properties.

The plates 12 and the junction parts 16 forming the single piece fuel element 10 are composed of coated fissile particles dispersed in an inert matrix with regard to the total number of fissile and fertile nuclei, and neutral to the coolant fluid that is likely to circulate inside and around the fuel element 10, particularly in the spaces 14.

The coated fissile particles are comparable to "TRISO" type particles described above. Each of them comprises a nucleus of a fissile body composed of plutonium and/or uranium. This nucleus is coated with several layers including a layer of silicon carbide SiC. The particles thus obtained are approximately spherical, and have a diameter that can vary from a few hundred microns to a few millimeters.

For example, uranium may be in the form of depleted uranium dioxide $UO_2$ (for example 0.25% of uranium 235 and 99.75% of uranium 238). Plutonium may for example be in the form of plutonium dioxide $PuO_2$ obtained from plutonium derived from an existing pressurized water nuclear reactor.

When the fuel element 10 contains uranium and plutonium, it is obtained by agglomerating particles containing a uranium dioxide nucleus and particles containing a plutonium dioxide nucleus, or mixed oxide particles $(U, Pu)O_2$.

The fuel may also contain an appropriate proportion of thorium as a fertile material.

The coated fissile particles made in this way are dispersed in a matrix that is inert to the total number of fissile and fertile nuclei, and to the coolant fluid. When this coolant fluid is water, the inert matrix is preferably composed either of silicon carbide SiC, or a metal, or a combination of both.

The presence of a limited proportion of metal in the matrix in which the coated fissile particles are dispersed is a means of facilitating manufacturing and machining of the fuel elements 10 in order to improve their mechanical properties. In particular, it may be useful to use steel when the size of the fuel element is such that operation is in fast spectrum, since steel is not very absorbent to neutrons.

With reference once again to FIG. 1, it can be seen that in the first embodiment of the invention, the fuel assembly 10 comprises four adjacent sub-assemblies 18 with the same dimensions. Each of the sub-assemblies 18 is formed from several parallel plates 12 (four in FIG. 1) connected to each other by junction parts 16a (that may or may not be fuel). The junction parts 16a are also in the shape of vertically-oriented plates. In FIG. 1, two parts of the junction 16a connect adjacent plates 12.

In the embodiment shown in FIG. 1, the plates 12 of two contiguous sub-assemblies 18 are perpendicular to each other, in order to limit the neutron flux.

Other junction parts 16b connect sub-assemblies 18 to each other, at the periphery of the fuel element 10, extending plates 12 at the edge of this periphery.

With the layout in FIG. 1, it is possible to define a space 20 with a cross-shaped horizontal cross-section, inside the fuel element 10. This space 20 with a cross-shaped horizontal cross-section may contain a control device 22 that may also have a cross-shaped horizontal cross-section. This control device 22 can control and/or shutdown the reactor under the effect of a vertical displacement, using techniques similar to techniques currently used in existing nuclear reactors. In particular, the control device 22 may be made of a boron carbide alloy $B_4C$.

As shown partially at 24 in FIG. 1, an additional control device, also cross-shaped, may be placed in the spaces 23 that separate four adjacent fuel elements 10 in the reactor core. This control device 24 may in particular be used as a complement to the previous device to control emergency shutdown of the reactor.

In the embodiment illustrated as an example in FIG. 1, the thickness e1 of the plates 12 and the widths e2 of the spaces 14 are approximately equal. Therefore the ratio of these dimensions e1 and e2 is equal to approximately 1. This layout is particularly suitable for a fuel element designed to operate in fast spectrum in the presence of water used as the coolant fluid. In other words, the water sheets separating adjacent plates 12 are then sufficiently thin compared with the thickness of these plates, so that water performs hardly any moderating function and participates only in cooling of the fuel element.

When the ratio between the thickness e1 of the plates 12 and the width e2 of the spaces 14 reduces, the coolant fluid performs an increasing moderating function. A simple dimensional modification of the dimensions e1 and e2 can thus transform the fuel element operating in fast spectrum illustrated in FIG. 1 into a fuel element operating in thermal or epithermal spectrum.

Figure 2:
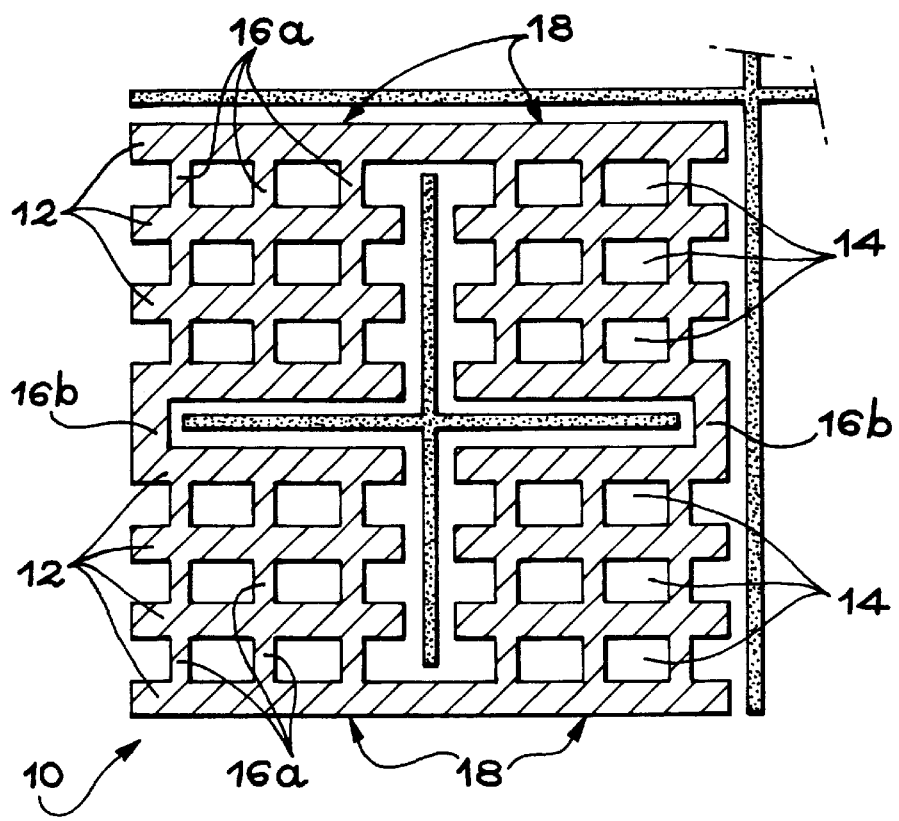
FIG. 2 is a top view comparable to FIG. 1 illustrating a second embodiment of the invention.

FIGS. 2 and 3 show the second embodiment of a nuclear fuel element according to the invention.

The general characteristics of the fuel element illustrated in FIGS. 2 and 3 are identical to the characteristics of the fuel element that has just been described with reference to FIG. 1. The only difference applies to the fact that the plates 12 in each of the four sub-assemblies 18 are all parallel to each other instead of being perpendicular from one sub-assembly to the next as in the embodiment shown in FIG. 1.

Figure 4:
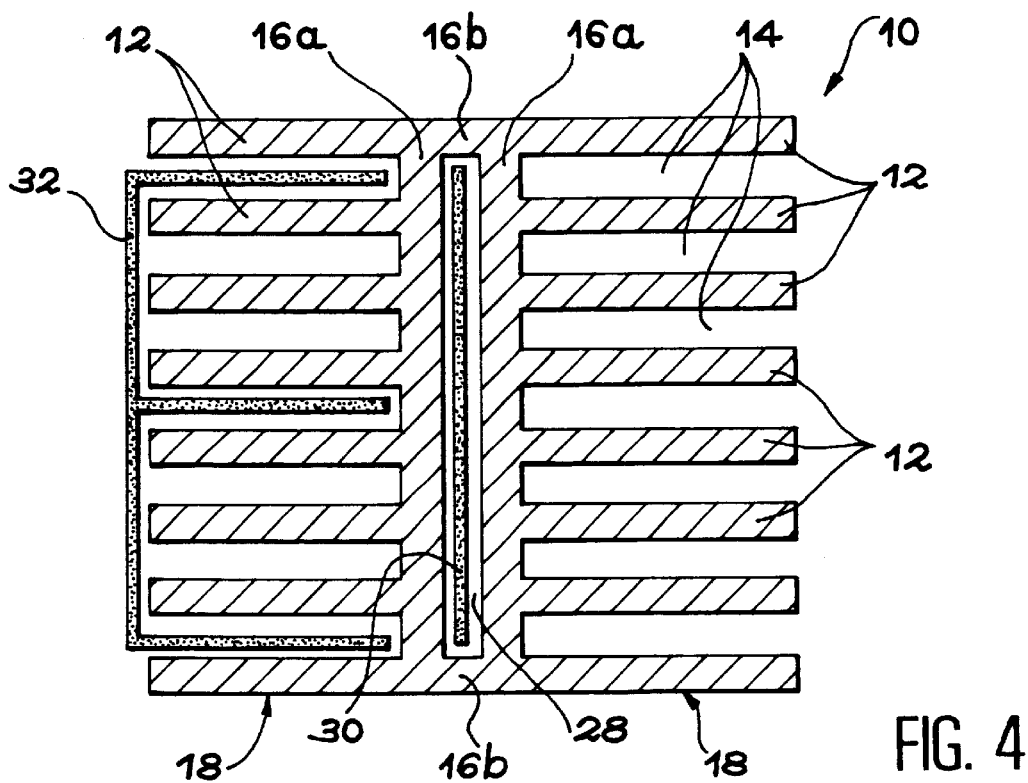
FIG. 4 is a top view comparable to FIGS. 1 and 2, illustrating a third embodiment of the invention.

FIG. 4 shows a top view of a third embodiment of a fuel element according to the invention. In this case, the fuel element is no longer composed of four sub-assemblies connected to each other by four junction parts 16b, but through two sub-assemblies 18 connected to each other by two junction parts 16b at the periphery of the fuel element 10.

The two sub-assemblies 18 have mirror symmetry with respect to each other. Each of them comprises a series of plates 12 parallel to each other, and a single junction part 16a connecting plane plates 12 to each other, at their end facing the centre of the fuel element. Each sub-assembly 18 thus has a comb-shaped cross-section, in which the junction part 16a is perpendicular to the plates 12.

In this layout, in the central part of the fuel element 10 the junction parts 16a and 16b delimit a space 28 with a horizontal cross-section in the shape of an elongated rectangle that extends over the entire height of the fuel element. A first control device 30 in the form of a plate can fit into this space 28 to control and/or shutdown the reactor.

As in the embodiments described above with reference to FIGS. 1 to 3, the plates 12 of each of the sub-assemblies 18 define uniform thickness spaces 14 between them. These spaces 14 open up into the external periphery of the fuel element. A second control device 32, with a horizontal cross-section in the shape of a rake, can also fit into each of the series of spaces 14 formed between the plates 12 of the same sub-assembly 18.

Note that as an alternative, the cross-section of the control device 32 may be such that it can penetrate between the plates 12 of two adjacent fuel elements 10. Like the control device 24 in FIG. 1, the control device 32 may be used particularly for an emergency shutdown of the reactor.

The layout that has just been described above with reference to FIG. 4 results in a fuel element having a shape comparable to the shape of a radiator, which facilitates heat exchanges between the said fuel element and the coolant fluid.

As already mentioned, a preferred application of the fuel element according to the invention applies to a pressurized water nuclear reactor operating in fast spectrum used to consume plutonium. For example, it is easy to obtain a fast spectrum when the values of the thickness e1 and the width e2 are chosen such that the ratio between these thicknesses is equal to approximately 1.

As an illustration of the invention that is in no way restrictive, approximately half (by volume) of the fuel element may be composed of coated fissile particles, half of these particles being composed of fissile oxide and the other half of the SiC coating, the other half of the fuel element consisting of the inert matrix. Thus if this matrix is composed of silicon carbide, approximately 75% by volume of the fuel element is composed of silicon carbide.

In the case of a reactor designed to consume plutonium, the fuel element 10 may for example comprise 34% by volume of particles containing depleted uranium dioxide $UO_2$ and 16% by volume of particles containing plutonium dioxide $PuO_2$. More precisely, for example, particles of depleted uranium dioxide $UO_2$ then comprise approximately 50% by volume of depleted uranium dioxide $UO_2$ and about 50% by volume of silicon carbide SiC. The expression "depleted uranium dioxide" in this case denotes an oxide containing 0.25% by volume of uranium 235 compared with 99.75% by volume of uranium 238. Similarly, particles of plutonium dioxide $PuO_2$ consist of approximately 50% by volume of plutonium dioxide and approximately 50% by volume of silicon carbide SiC.

Obviously, this composition is only given as an example and it must not be considered as limiting the scope of the invention. In general, the content of fissile nuclei in fuel elements is optimised depending on the strategy assigned to the reactor core. In particular, the plutonium content is determined based on the chosen duration for the fuel cycle; the depleted uranium content is chosen to obtain a satisfactory compromise between the need to obtain high kinetic coefficients (Doppler coefficient and fraction of delayed neutrons) and to limit the production of plutonium by the conversion reaction of uranium 235 into plutonium 239. Furthermore, thorium may be used in the composition of the assembly.

As an illustration, calculations were carried out based on the composition of fuel elements given in the example above. In these calculations, it was assumed that the plutonium used in the composition of the fuel element according to the invention was "2016 quality" plutonium. This expression refers to plutonium for which the average composition is equal to the average that will be produced in the year 2016 by 900 MW electric pressurized water reactors after three conventional cycles, cooled for three years, reprocessed and manufactured within the following two years.

Table I shows the initial composition of heavy nuclei of a reactor core conform with the example considered, and the final composition of the core after three 54-month cycles (values given as an example) in the core of a boiling water nuclear reactor operating in fast spectrum. In this table, the mass values expressed in kilograms were calculated assuming a core with a diameter of 4 meters and a height of 376 cm, corresponding to a fuel volume of about 23 m$^3$.

Table I shows that the use of fuel elements formed in this way in a boiling water reactor operating in fast spectrum is a means of assuring a large consumption of plutonium, close to 43% of the initial content in the example considered. As a comparison, the only operational solution for a pressurized water reactor using 30% of MOX type fuel is limited to a consumption of about 25% plutonium.

Note also that the content of fissile plutonium and particularly plutonium 241 is still high after three 54-month cycles (value given as an example). This means that additional reprocessing of the plutonium would be possible in the case of a multiple recycling strategy.

TABLE I

|  | Initial state | | Final state | | |
|---|---|---|---|---|---|
|  | Mass (kg) | Vector (%) | Mass (kg) | Vector (%) | Variation (%) |
| $^{235}$U | 82.9 |  | 38.4 |  | (−53.7) |
| $^{238}$U | 33.059 |  | 30.255 |  | (−8.5) |
| $^{238}$Pu | 420 | 2.74 | 467 | 5.31 | +11.1 |
| $^{239}$Pu | 8.718 | 56.54 | 2.667 | 30.17 | −69.4 |
| $^{240}$Pu | 4.032 | 26.04 | 3.256 | 36.68 | −19.3 |
| $^{241}$Pu | 1.152 | 7.42 | 1.342 | 15.06 | +16.55 |
| $^{242}$Pu | 1.136 | 7.28 | 1.143 | 12.78 | +0.6 |
| Pu$_{tot}$ | 15.460 |  | 8.877 |  | −42.7 |
| $^{241}$Am | 109 |  | 314 |  |  |
| $^{243}$Am | — |  | 318 |  |  |
| $^{242}$Cm | — |  | 31 |  |  |
| $^{244}$Cm | — |  | 226 |  |  |
| $^{237}$Np | — |  | 8 |  |  |
| Total minor actinides | 109 |  | 910 |  | +5.82 (% Pu initial) |

Figure 5:
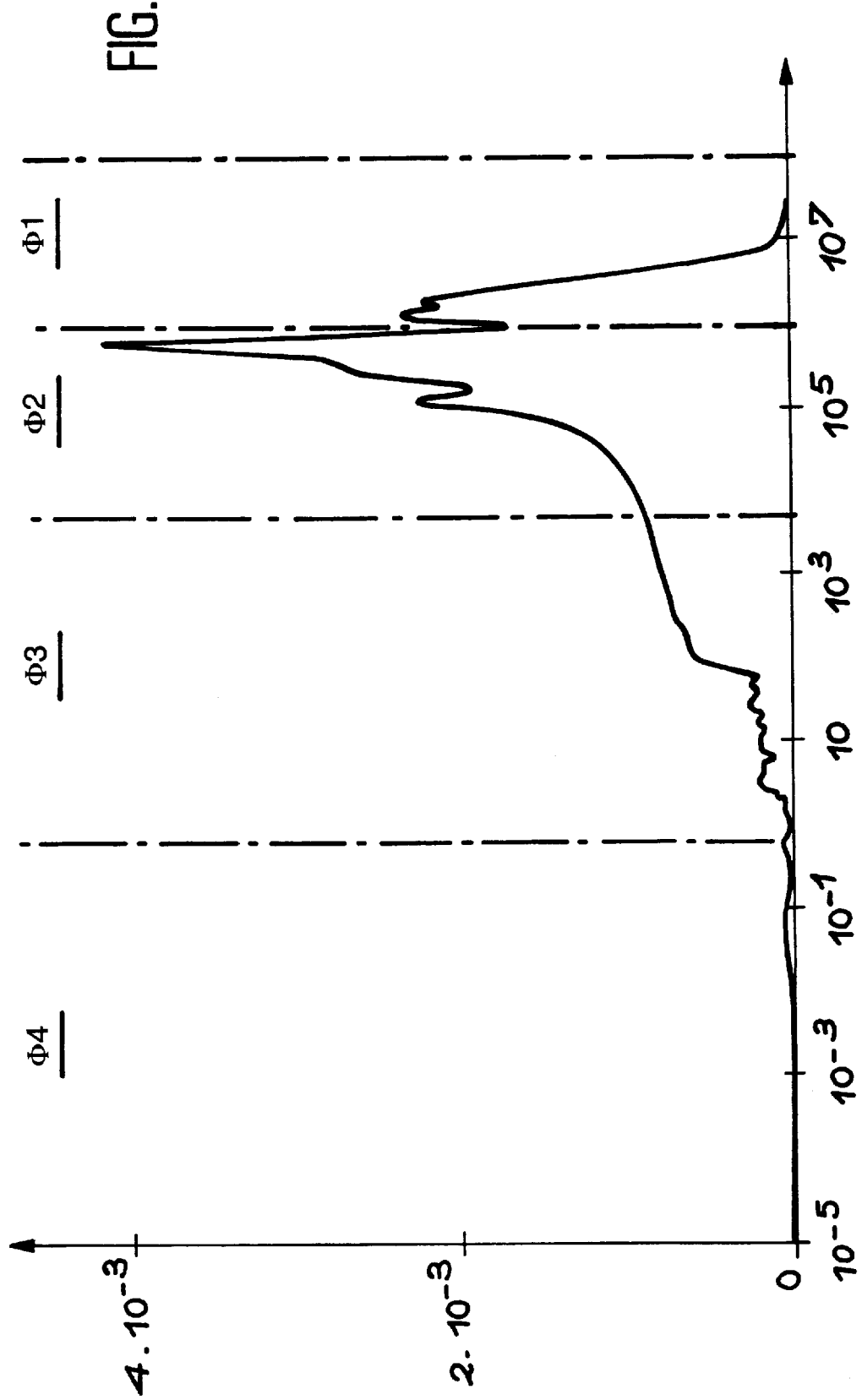
FIG. 5 represents the neutronic spectrum obtained by calculation in an infinite medium, assuming fuel elements conform with the invention forming the core of a boiling water nuclear reactor, at a core level at which the steam ratio is 40%.

FIG. 5 shows the neutronic spectrum of a boiling water reactor formed from fuel elements according to the invention, with a core conform with Table I. In other words, FIG. 5 shows the neutron flux distribution (n.s$^{-1}$.cm$^{-2}$) as a function of the energy (in electron volts) in an infinite medium for a steam presence equal to 40%. This spectrum was produced using the CEA (Commissariat à l'Energie Atomique-Atomic Energy Commission) APOLLO 2 calculation program. It confirms that the neutron flux in the core is essentially a fast neutrons flux (speed of the order of 40,000 km/s).

More precisely, according to the calculated spectrum, the proportion of the fast flux $\phi 1$ to the total flux $\phi$ is 32.3%, the proportion of the deceleration flux $\phi 2$ to the total flux $\phi$ is 44.3%, the proportion of the epithermal flux $\phi 3$ to the total flux $\phi$ is 22.3% and the proportion of the thermal flux $\phi 4$ to the total flux is 1.1%.

Therefore, it is possible to generate a significant number of uranium 238 and plutonium 240 fissions. At the same time, conversion of uranium 238 into plutonium 239 is reduced, and thermal fissions of plutonium 239 are also reduced, which is conducive to obtaining a high fraction of delayed neutrons in the core.

Comparable calculations were carried out in the lower part of the reactor where the water is entirely in the liquid state. The spectrum obtained has the same characteristics and particularly a very low thermal component, the proportion of thermal flux to the total flux then being equal to 1.9%.

Furthermore, neutron calculations have shown that the reactivity coefficient of the new core (in an infinite medium) is of the order of 1.307. The values of the power and the length of the cycle can be adapted as a function of needs. If the power per unit volume of the core is equal to 45.8 MW per m$^3$ (fuel plus fluid), the cycles obtained are very long and an unloading combustion rate of more than 160 GWd/t can be obtained. This results in 54-month (4.5 year) long cycles.

Furthermore, the Doppler coefficient obtained using the same calculation is of the order of −2.63 pcm/° C. such that an intrinsically safe behaviour of the core can be achieved in the case of a power excursion in which the fuel temperature is increased.

Similarly, the proportion of delayed neutrons is 315 pcm which enables a good margin of control over the reactor if a control device should accidentally be withdrawn. This helpful phenomenon is accentuated by the fact that coated fissile particles are dispersed in a silicon carbide matrix with a strong resistance to fracture and a high melting temperature.

Concerning a return to a reactor cold shutdown, the moderating coefficient is negative and limited over the entire temperature interval between 300° C. (nominal reactor operating temperature) and 20° C. Thus, this moderator coefficient is equal to −14.88 at 220° C. and −3.16 at 20° C. These relatively low values are consistent with values obtained for a boiling water reactor using MOX type fuel assemblies. Therefore, they do not cause any particular problem for control when returning to the reactor cold shutdown.

Calculations have also been carried out to study the feasibility of a fast spectrum boiling water reactor using fuel elements according to the invention, particularly from a thermal point of view and concerning the control aspect.

In the estimated example given above, every fuel element defines a water passage cross-section Sp and a fuel cross-section Sc, both equal to 0.0032 m$^2$. The chosen mass flow of the coolant fluid is 750 kg/m$^2$.s, which gives flow speeds slightly greater than 1 m/s., which implies low hydraulic pressure losses due to water flow in the core.

An average thermal flux equal to 816 kW/m$^2$ is chosen in order to maintain a ratio between the thermal flux and the critical flux indicated in Groeneveld's tables for the water passage section indicated above equal to 2.5, with a mix quality of 0.25 and a pressure of 80 bars. This requires an average power density per unit volume equal to 91.7 MW/M$^3$ for fuel, 45.8 MW per cubic meter of core (fuel plus two-phase mix) and a core height of 3.76 m. The extracted thermal power for a 4 m diameter core is then equal to 2163 MW, which results in an electric power equal to about 720 MWe.

The temperature at the centre of the fuel for this value of the power per unit volume is of the order of 400° C., using a linear coefficient of conduction equal to 60 W/m$^2$.° C. (approximate value for SiC at 400° C.). This relatively low temperature difference between the coolant at 295° C. and the fuel facilitates the management of most accident transients used to size safeguard systems, particularly for reflooding the core. The low temperature compared with the integrity range of the coated fissile particles and their SiC matrix suggests that risks of core meltdown will be very low.

The layout described above makes it easy to encourage operation of the core in natural convection by "venting" the reactor core, by enabling a large free cross-section for water flow in the core, with relatively low flow speeds in the core to obtain low pressure losses. The choice of a low recirculation rate (for example equal to 4) enables high void ratios at the top of the core and therefore a large driving force due to the large difference in density between the liquid contained in the water return and the two-phase mix in the core.

In the above calculation example, the low power extracted from the fuel results in very long cycles.

It is calculated that the cycle length is still attractive (36 months, or 3 years) even if the power is higher, for example 1450 MWe, whereas consumption and depletion of plutonium is slightly greater than that in the previous example, and the production of minor actinides remains slightly lower.

Concerning reactor control, the fast spectrum and the two-phase aspect of the coolant fluid make the use of soluble boron impossible. Similarly, the efficiency of burnable (poisons in the fuel is limited.

The use of the control device 22 with a cross-shaped cross-section made of an absorbent material (for example B$_4$C) approximately 1 cm thick, makes it possible to return to sub-critical conditions under the worst case assumption of an infinite medium and a new core, and in the liquid water configuration applicable when the reactor is started.

In operation, considering the large "neutron content" of a control device such as device 22, not all possible positions will be occupied by shutdown devices. The available places will be occupied by reactivity control and compensation devices made from materials with an efficiency appropriate to the needs and with improved resistance to irradiation, such as hafnium diboride HfB$_2$ or compounds of dysprosium and boron.

Finally, complementary control devices such as the device 24 in FIG. 1 may, for example, have a thickness of about 0.5 cm. These devices may be used as complementary shutdown systems for control, or even for the incineration of actinides or fission products that act as burnable poisons.

What is claimed is:

1. A fuel element for a nuclear reactor, formed from coated fissile particles embedded in a matrix, comprising:
    a monolithic member formed of a single piece including:
       plural parallel plates separated by spaces; and
       junction parts configured to connect said parallel plates,
    wherein the matrix is inert to heavy nuclei, fissile and fertile, and neutral to a coolant fluid that circulates in the spaces.

2. The fuel element according to claim 1, wherein the fuel element has a parallelepiped-like shape.

3. The fuel element according to claim 1, wherein the plates are approximately plane.

4. The fuel element according to claim 1, wherein the plates are approximately vertical and one of the spaces is configured to contain a control device.

5. The fuel element according to claim 4, wherein the junction parts and the parallel plates are perforated at predetermined levels to form windows through which the coolant fluid can circulate.

6. The fuel element according to claim 4, wherein the space in which the control device is configured to be contained has a horizontal cross-section in a shape of a cross, and the space divides the fuel element in four sub-assemblies each comprising plural plates connected to each other by some of the junction parts, others of the junction parts connecting the sub-assemblies to each other.

7. The fuel element according to claim 6, wherein the plates of contiguous sub-assemblies are perpendicular to each other.

8. The fuel element according to claim 6, wherein the plates of the four sub-assemblies are parallel to each other.

9. The fuel element according to claim 1, wherein the plates and spaces have thicknesses and widths with a ratio suitable for defining a fast spectrum for the coolant fluid.

10. The fuel element according to claim 9, wherein the ratio is approximately equal to 1 when water is used as the coolant fluid.

11. The fuel element according to claim 1, wherein the fuel element is protected by a metal duct.

12. The fuel element according to claim 1, wherein the fuel material particles comprise fissile particles chosen from the group comprising uranium and plutonium.

13. The fuel element according to claim 1, wherein the inert matrix is made from a material chosen from the group comprising silicon carbide SiC, a metal, and a combination of the two.

* * * * *